(12) United States Patent
Udall et al.

(10) Patent No.: US 7,168,713 B2
(45) Date of Patent: Jan. 30, 2007

(54) MOBILE STORAGE UNIT

(75) Inventors: Laura Elizabeth Udall, San Jose, CA (US); Nicholas V. Udall, San Jose, CA (US)

(73) Assignee: Zuca, Inc., Campbell, CA (US)

( * ) Notice: Subject to any disclaimer, the term of this patent is extended or adjusted under 35 U.S.C. 154(b) by 0 days.

(21) Appl. No.: 11/223,409

(22) Filed: Sep. 9, 2005

(65) Prior Publication Data

US 2006/0006617 A1 Jan. 12, 2006

Related U.S. Application Data

(62) Division of application No. 10/123,753, filed on Apr. 17, 2002.

(51) Int. Cl.
*B62B 1/16* (2006.01)

(52) U.S. Cl. .............................. 280/47.26; 280/47.25; 280/47.19; 280/655.1

(58) Field of Classification Search ............ 280/655.1, 280/652, 654, 655, 47.17, 47.19, 47.2, 47.24, 280/47.26, 47.315, 47.25
See application file for complete search history.

(56) References Cited

U.S. PATENT DOCUMENTS

| | | | | |
|---|---|---|---|---|
| 2,835,503 A | 5/1958 | Humphries et al. | ...... | 280/47.19 |
| 2,842,373 A * | 7/1958 | Duerr | ...... | 280/47.19 |
| 2,905,480 A | 9/1959 | Giovannelli | ...... | 280/34 |
| 3,460,850 A | 8/1969 | Franklin | ...... | 280/47.2 |
| D222,933 S | 2/1972 | Brown | ...... | D14/3 |
| 3,669,463 A | 6/1972 | Boudreau | ...... | 280/47.37 |
| 3,677,571 A * | 7/1972 | Maturo et al. | ...... | 280/654 |
| 3,684,307 A | 8/1972 | Bourgraf et al. | ...... | 280/36 C |
| 3,759,538 A | 9/1973 | Fabiano | ...... | 280/47.35 |
| 3,829,113 A | 8/1974 | Epelbaum | ...... | 280/30 |
| 4,165,088 A * | 8/1979 | Nelson | ...... | 280/47.35 |
| 4,247,130 A * | 1/1981 | Paterson | ...... | 280/654 |
| 4,350,366 A | 9/1982 | Helms | ...... | 280/655 |
| 4,795,186 A | 1/1989 | Tyus | ...... | 280/651 |
| 5,118,130 A * | 6/1992 | Kaltz | ...... | 280/654 |
| 5,244,225 A | 9/1993 | Frycek | ...... | 280/304.1 |
| D358,695 S | 5/1995 | Hudson et al. | ...... | D34/26 |
| 5,462,299 A | 10/1995 | Maddux | ...... | 280/47.35 |
| 5,833,250 A | 11/1998 | Schier et al. | ...... | 280/47.19 |
| 5,988,657 A | 11/1999 | Henkel | ...... | 280/47.25 |
| 6,345,830 B1 | 2/2002 | Chavez | ...... | 280/47.28 |
| 6,386,557 B1 | 5/2002 | Weldon | ...... | 280/30 |
| 6,454,065 B1 | 9/2002 | Chen | ...... | 190/18 A |
| 6,520,514 B2 | 2/2003 | Clegg | ...... | 280/47.26 |
| 6,880,851 B1 | 4/2005 | Summers et al. | ...... | 280/652 |

* cited by examiner

Primary Examiner—Jeff Restifo
(74) Attorney, Agent, or Firm—Haverstock & Owens LLP

(57) ABSTRACT

A mobile storage unit is disclosed. The mobile storage unit comprises at least two structural frames, a seat portion coupled to the at least two structural frames, a handle assembly coupled to the seat portion, a bottom panel coupled to the at least two structural frames whereby a storage area is created below the seat portion, above the bottom portion and between the at least two structural frames and at least two wheels coupled to the bottom panel. Through the use of the present invention, the potential for back problems that are associated with the use of the traditional backpack is eliminated. Additionally, the mobile storage unit provides an easily accessible storage area for the user/student in the case where no locker is provided. Furthermore, the mobile storage unit incorporates a seat portion which allows a user to utilize the mobile storage unit as a seat in situations where one is needed yet not available.

22 Claims, 7 Drawing Sheets

MOBILE STORAGE UNIT

RELATED APPLICATION

This Application is a Divisional Application of the co-pending application Ser. No. 10/123,753, entitled "MOBILE STORAGE UNIT", filed Apr. 17, 2002, the contents of which is hereby incorporated by reference.

FIELD OF THE INVENTION

The present invention relates to portable luggage and more particularly to a mobile storage unit with an integrated seat.

BACKGROUND OF THE INVENTION

Backpacks are commonplace in use, for example, as a carrier to conveniently transport a student's books and belongings to school. The usual advantage is in supporting a substantial or inconvenient load on a user's torso, specifically the user's back, rather than the user's arms which would tire more quickly. It also frees up the user's arms for other use. FIG. 1 shows a typical backpack configuration. FIG. 1 shows a student 110 carrying a backpack 120.

The use of backpacks is steadily increasing amongst grade school students since many schools are being built without lockers in order to stop vandalism and prevent students from hiding drugs or weapons. Since there are no lockers, students are forced to carry all of their belongings in a single backpack. Couple this with the fact that textbooks are getting bigger—some tip the scales at six pounds—and in increase in after school activities and the result is an increased amount of weight that students are carrying on their backs.

This extra burden that students are faced with can result in poor posture and back pain. Studies show that the average daily load carried by students is 20.5 lbs., with the maximum load reaching as much as 50 lbs. In fact, according to the U.S. Consumer Product Safety Commission, some 6,000 kids age 17 and under suffered backpack-related sprains and strains costing an average of $11,000 per injury.

Accordingly, what is needed is a device that addresses the above-outlined problems associated with the use of backpacks. The present invention addresses such a need.

SUMMARY OF INVENTION

A mobile storage unit is disclosed. The mobile storage unit comprises at least two structural frames, a seat portion coupled to the at least two structural frames, a handle assembly coupled to the seat portion, a bottom panel coupled to the at least two structural frames whereby a storage area is created below the seat portion, above the bottom portion and between the at least two structural frames and at least two wheels coupled to the bottom panel.

Through the use of the present invention, the potential for back problems that are associated with the use of the traditional backpack is eliminated. Additionally, the mobile storage unit provides an easily accessible storage area for the user/student in the case where no locker is provided. Furthermore, the mobile storage unit incorporates a seat portion which allows a user to utilize the mobile storage unit as a seat in situations where one is needed yet not available.

DETAILED DESCRIPTION

The present invention relates to a mobile storage unit. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is presented in the context of a preferred embodiment. The preferred embodiment of the present invention is a mobile storage unit for use by students and the like for transporting textbooks, school materials, etc. Accordingly, through the use of the mobile storage unit in accordance with the present invention the potential for back problems that are associated with the use of the traditional backpack is eliminated. Furthermore, the mobile storage unit incorporates a seat portion which allows a user to utilize the mobile storage unit as a seat in situations where one is needed yet not available.

Although the preferred embodiment of the present invention is presented in the context of being utilized by students for the transportation of textbooks, school supplies, etc., one of ordinary skill in the art will readily recognize that the present invention could be used to transport a variety of articles (laptop computers, business materials, files, clothes, groceries, etc.) while remaining within the spirit and scope of the present invention.

Figure 1:
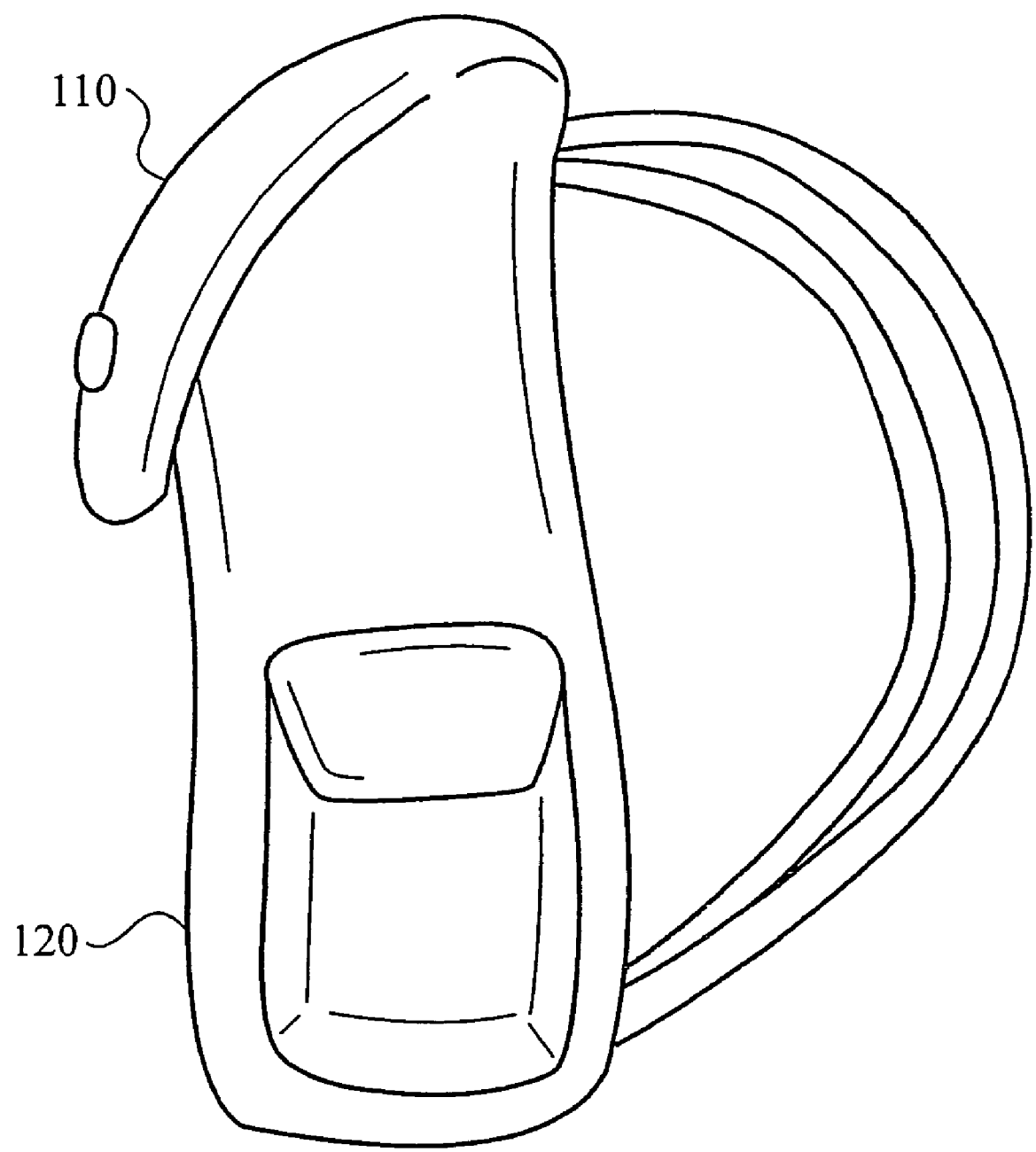
FIG. 1 shows a typical backpack configuration.
Figure 2:
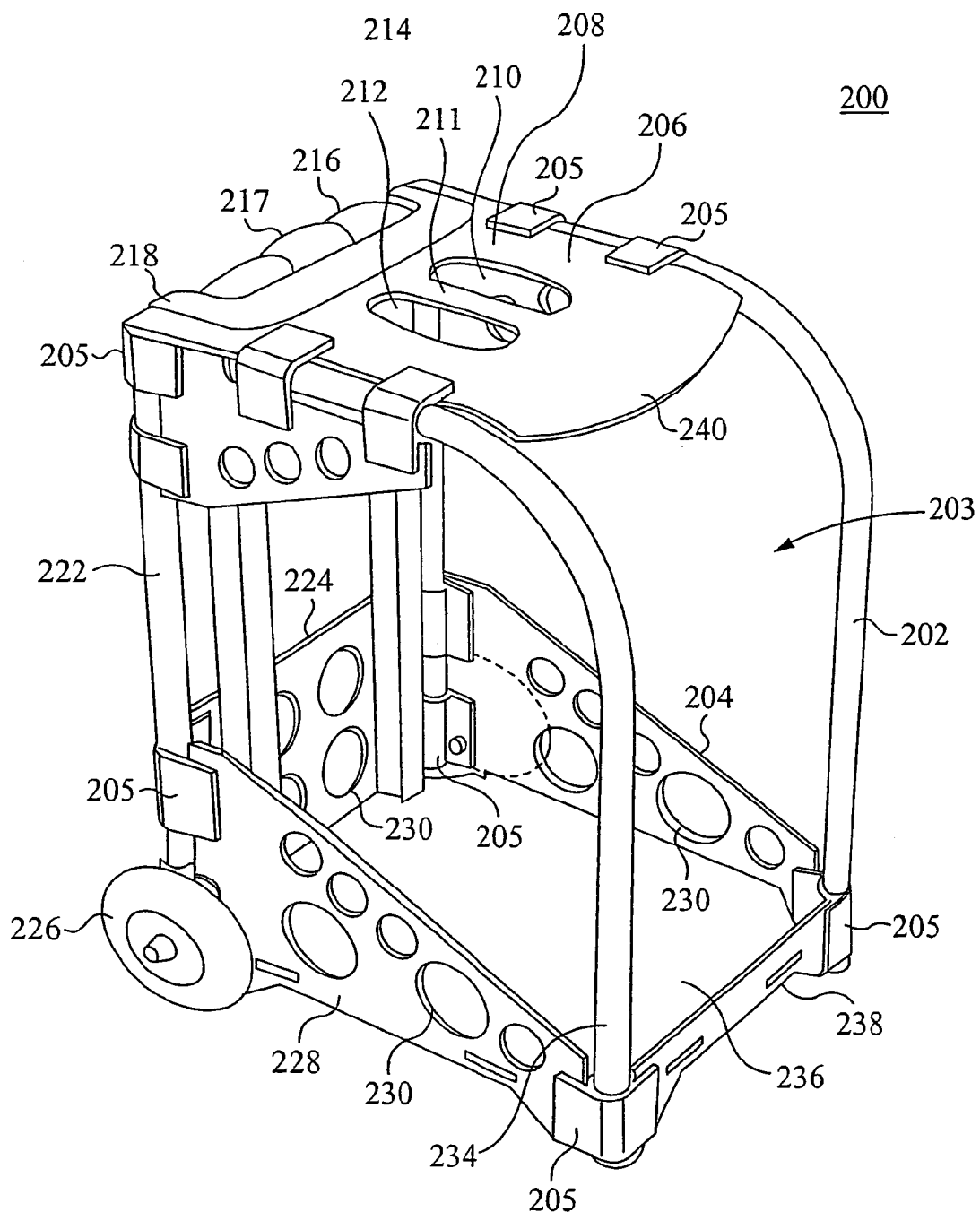
FIG. 2 shows the preferred embodiment of the present invention.

For a better understanding of the present invention, please refer now to FIG. 2. FIG. 2 is an illustration of the preferred embodiment of the mobile storage unit 200 in accordance with the present invention. The mobile storage unit 200 comprises first, second, third and fourth structural frames 202, 232,7 222, 234, a seat portion 208, and a handle assembly 214. The mobile storage unit 200 also includes a right upper panel 206, a left upper panel 220, a right lower panel 204, a left lower panel 228, a back panel 224, a front panel 238, and a bottom panel 236. The mobile storage unit 200 further comprises two wheels 226, 227.

The various components of the mobile storage unit 200 are interconnected via structural brackets 205. Accordingly the first structural frame 202 is coupled to the seat portion 204 via structural brackets 205. The first structural frame 202 is also coupled to the right upper panel 206, the right lower panel 204 and the front panel 236 via structural brackets 205. The handle assembly 214 is coupled to the seat portion 208. The second structural frame 232 is coupled to the right upper panel 206, the right lower panel 204 and the bottom panel 236 via structural brackets 205.

The third structural frame 222 is coupled to the left upper panel 220, the lower left panel 228 and the bottom panel 236. The fourth structural frame 234 is coupled to the seat portion 208, the right upper panel 220, the left lower panel 228, and the front panel 238 via structural brackets 205. The wheels 226, 227 are coupled to the right and left lower panels 204, 228 respectively via structural brackets 205.

The area below the seat portion 208 and above the bottom panel 238 defines a storage area 203. It is within this storage area 203 that a user can place articles such as textbooks, school materials, laptop computers, clothes, etc. It should be naturally understood that the storage area 203 should provide enough space to accommodate these materials, however the size of the storage area will depend on the dimensions and configurations of the various components (structural frames, panels, etc.) of the mobile storage unit 200.

The structural frames 202, 232 222, 234 are preferably comprised of rigid structural tubing. The tubing could be comprised of aluminum, high strength plastic or any of a variety of structural rigid materials.

The structural brackets 205 are preferably comprised of polished aluminum or high strength plastic, however it should be appreciated that any of a variety of materials could be utilized. The structural brackets 205 are preferably attached to the various components of the mobile storage unit 200 via mechanical bolts or fasteners thereby providing rigidity to the mobile storage unit. It should be readily apparent though that the structural brackets could also be attached to the various components via a strong adhesive (high strength glue, epoxy, etc.) or a variety of other fastening means.

The seat portion 208 is coupled to the first and fourth structural frames 202, 234 via the structural brackets 205 and is designed to provide a "seat" for a user of the mobile storage unit 200. The seat portion 208 is designed to accommodate up to 600 lbs. and is preferably comprised of a high strength rigid material such as a polycarbonate material, reinforced nylon, etc. Accordingly, a user sits on the seat portion 208 when the mobile storage unit is in an upright position (as shown in FIG. 2).

In addition to providing a seat for the user, the seat portion 208 also includes an integrated handle whereby the integrated handle can be utilized to pick up the mobile storage unit 200 with relative ease. Preferably, the integrated handle comprises two apertures 210, 212 in the seat portion 208 wherein the two apertures 210, 212 have a section of rigid material disposed therebetween. Accordingly, the section of rigid material disposed between the two apertures 210, 212 can be grasped by a user in order to pick up the mobile storage unit 200.

The seat portion 208 also preferably includes a curved portion 240. The curved portion 240 is designed to provide lateral resistance to the rigid material that comprises the seat portion 208, thereby preventing the seat portion 208 from bending under the weight of user in situations where the mobile storage unit 200 is being utilized as a seat for the user.

Figure 3:
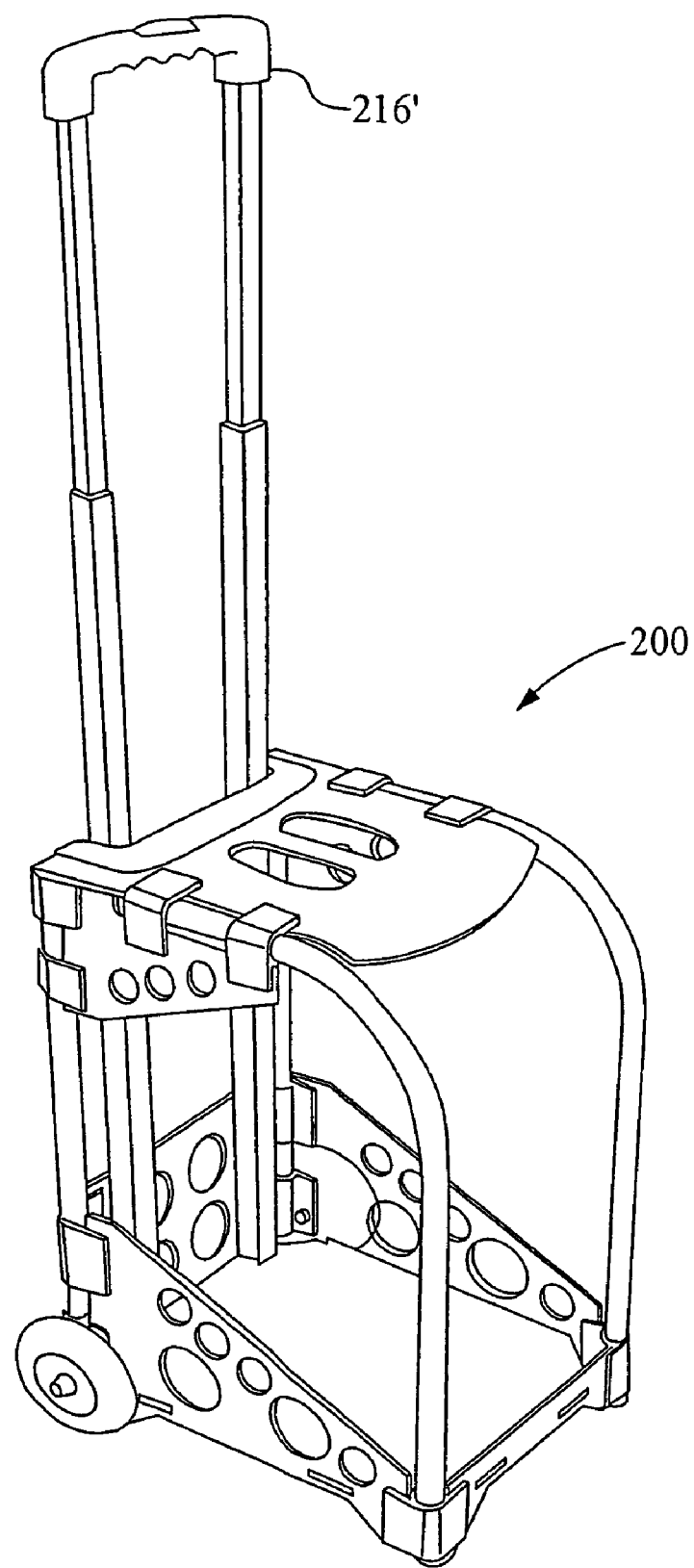
FIG. 3 shows the mobile storage unit wherein the handle is in a fully extended position.

The handle assembly 214 is coupled to the seat portion 208 and is preferably comprised of a high strength plastic material. The handle assembly 214 comprises a handle tray 218 and an extendable/retractable handle 216 coupled to the handle tray 218. The handle tray 218 is preferably coupled to the seat portion 208 via a strong adhesive compound or other suitable means. The handle 216, when in an extended position, is designed to be grasped by the user thereby allowing the user to pull and transport the mobile storage unit 200. For a better understanding, please see FIG. 3. FIG. 3 shows the mobile storage unit 200 wherein the handle 216' is in a fully extended position.

Please refer back to FIG. 2. The handle 216 includes a button 217. The button 217, when depressed, triggers a locking mechanism wherein the locking mechanism locks/unlocks the handle 216 when the handle 216 is in various extended positions. For example, if the user doesn't want to fully extend the handle 216, the user can extend the handle 216 to a desired extension and depress the button 217, thereby "locking" the handle 216 at the desired extension. A subsequent depression of the button 217 "unlocks" the handle 216 thereby allowing the user to extend/retract the handle 216 accordingly.

Although the preferred embodiment of the mobile storage unit is described as incorporating the above-described handle assembly, one of ordinary skill in the art will readily recognize that a variety of handle assemblies could by employed while remaining within the spirit and scope of the present invention.

The upper and lower panels 204, 206, 220, 228, along with the front and back panels 224, 238 are preferably comprised of the same material as the seat portion 208 and are designed to add rigidity to the mobile storage unit 200. The panels preferably include holes 230 disposed therein. These holes 230 serve two purposes. First, they are incorporated to reduce the weight of the panels and thereby reduce the overall weight of the mobile storage unit 200. Additionally, the holes 230 in the upper panels 206, 220 and lower panels 204, 228 can be used to hold key rings and the like or to incorporate bungee cord or other articles.

The mobility of the mobile storage unit 200 is provided via the wheels 226, 227. Preferably a first wheel 227 is coupled to the lower right panel 204 and the second structural frame 232 via a structural bracket 205 and a second wheel 226 is coupled to the lower left panel 228 and the third structural frame 222 via a structural bracket 205. The wheels 226, 227 are preferably at least 100 mm in diameter and can include LED lights to increase the visibility of mobile storage unit 200 when the mobile storage unit 200 is used at night or in similar dark surroundings.

Figure 4:
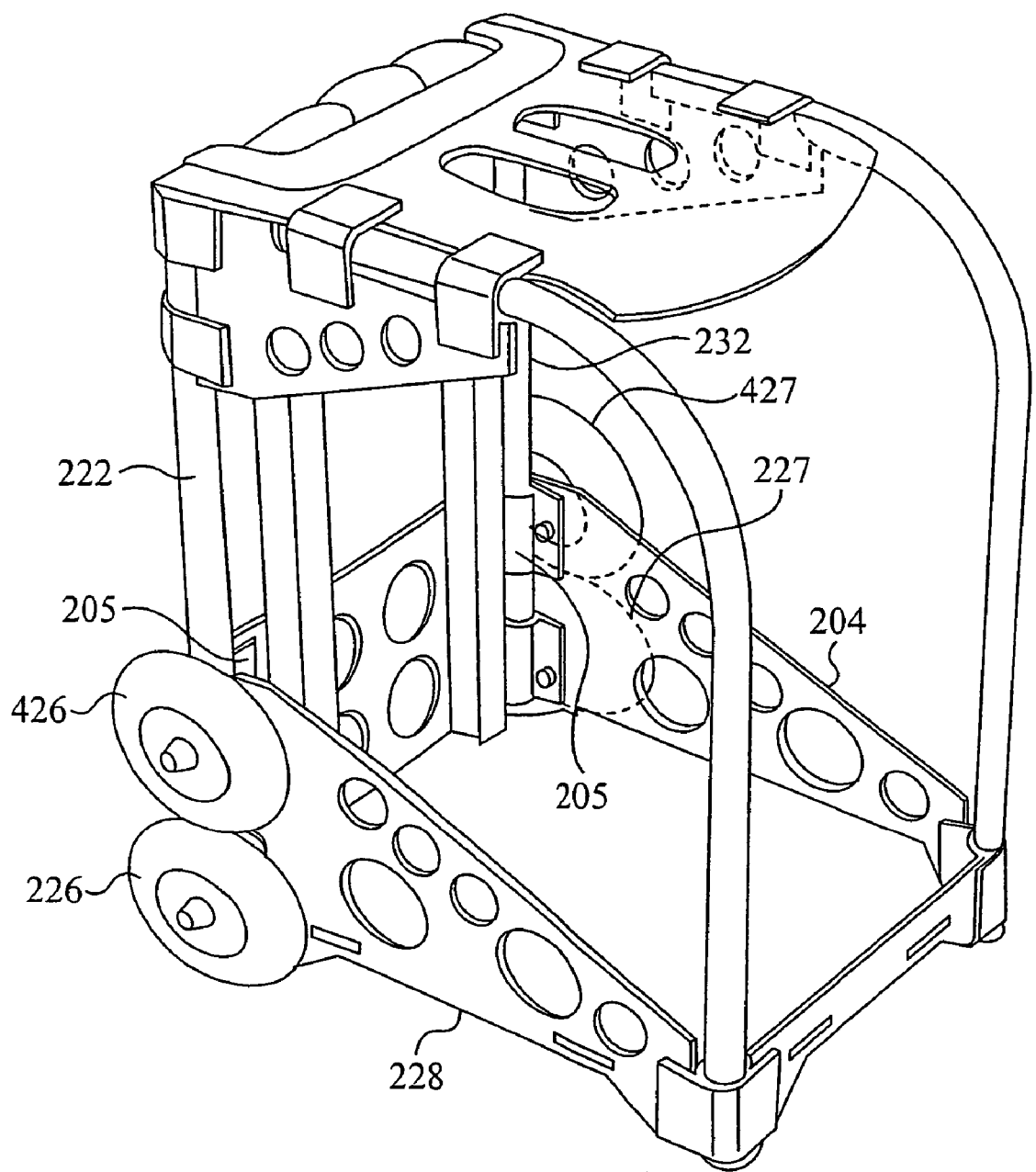
FIG. 4 shows an alternate embodiment of the mobile storage unit in accordance with the present invention.

Although the preferred embodiment of the mobile storage unit in accordance with the present invention employs only two wheels, an alternate embodiment of the present invention could employ a third and fourth wheel. For a better understanding, please refer now to FIG. 4. FIG. 4 shows an alternate embodiment of the mobile storage unit in accordance with the present invention. FIG. 4 shows a third wheel 427, located above the first wheel 227, coupled to the lower right panel 204 and the second structural frame 232 via a structural bracket 205 and a fourth wheel 426, located above the second wheel 226, coupled to the lower left panel 228 and the third structural frame 222 via a structural bracket 205.

The third and fourth wheels 426, 427 add convenience to the mobile storage unit 200 in that they enable the mobile storage unit to traverse curbs and stairs with less difficulty. For example, if the user is attempting to traverse a curb with the two-wheeled configuration, the second and third structural frames 222, 232 engage the curb surface first. Accordingly, in order to engage the first and second wheels 226, 227 with the curb surface, the user has to drag the mobile storage unit up the curb surface against the friction of the second and third structural frames 222, 232.

However, with the incorporation of the third and fourth wheels 426, 427, the third and fourth wheels 426, 427 will engage the curb surface first when the user attempts to traverse the curb. This allows the user to pull the mobile storage unit up the curb surface and subsequently engage the first and second wheels 226, 227 without the friction of the second and third structural frames 222, 232. This significantly decreases the burden that the user faces when traversing curbs and stairs with the mobile storage unit.

Figure 5:
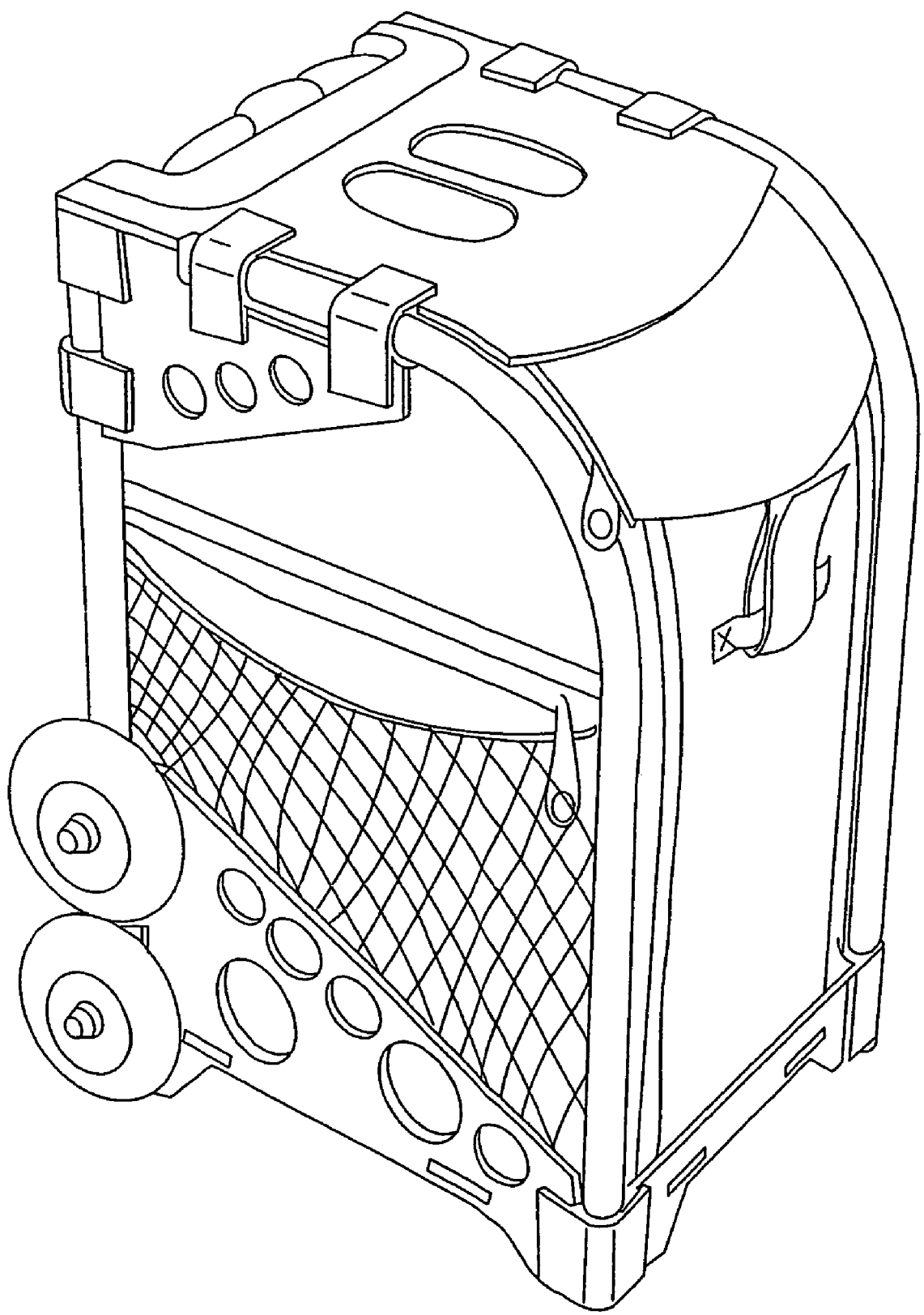
FIG. 5 is a view of the mobile storage unit in accordance with the present invention being utilized in conjunction with a fabric material.

It is further contemplated that the mobile storage unit in accordance with the present invention could be used in conjunction with case or bag comprised of a reinforced fabric material such as canvas. For a more detailed understanding, please refer now to FIG. 5. FIG. 5 is a perspective of the mobile storage unit in accordance with the present invention being utilized in conjunction with the bag.

As can be seen in FIG. 5, the mobile storage unit includes a bag 510 wherein the bag is displaced within the storage area of the mobile storage unit. The bag 510 is preferably coupled to any or all of the structural frames 202, 222, 234. Preferably, the bag 510 is coupled to the respective structural frames utilizing a Velcro-type fastener or other suitable fastening means.

The bag 510 preferably includes two lockable zippers 511, 512 wherein the bag 510 can be opened and closed thereby providing access to the storage space within the mobile storage unit. The bag 510 also includes a zipper 513 for providing access to the storage space within the mobile storage unit. Also shown is a side net pocket 514 that could be utilized to store pens, pencils, calculators, etc.

Although the above-described embodiment of the mobile storage unit is described as incorporating a reinforced fabric material such as canvas, one of ordinary skill in the art will readily appreciate that any of a variety of fabric materials could by employed in conjunction with the mobile storage unit while remaining within the spirit and scope of the present invention.

Figure 6:
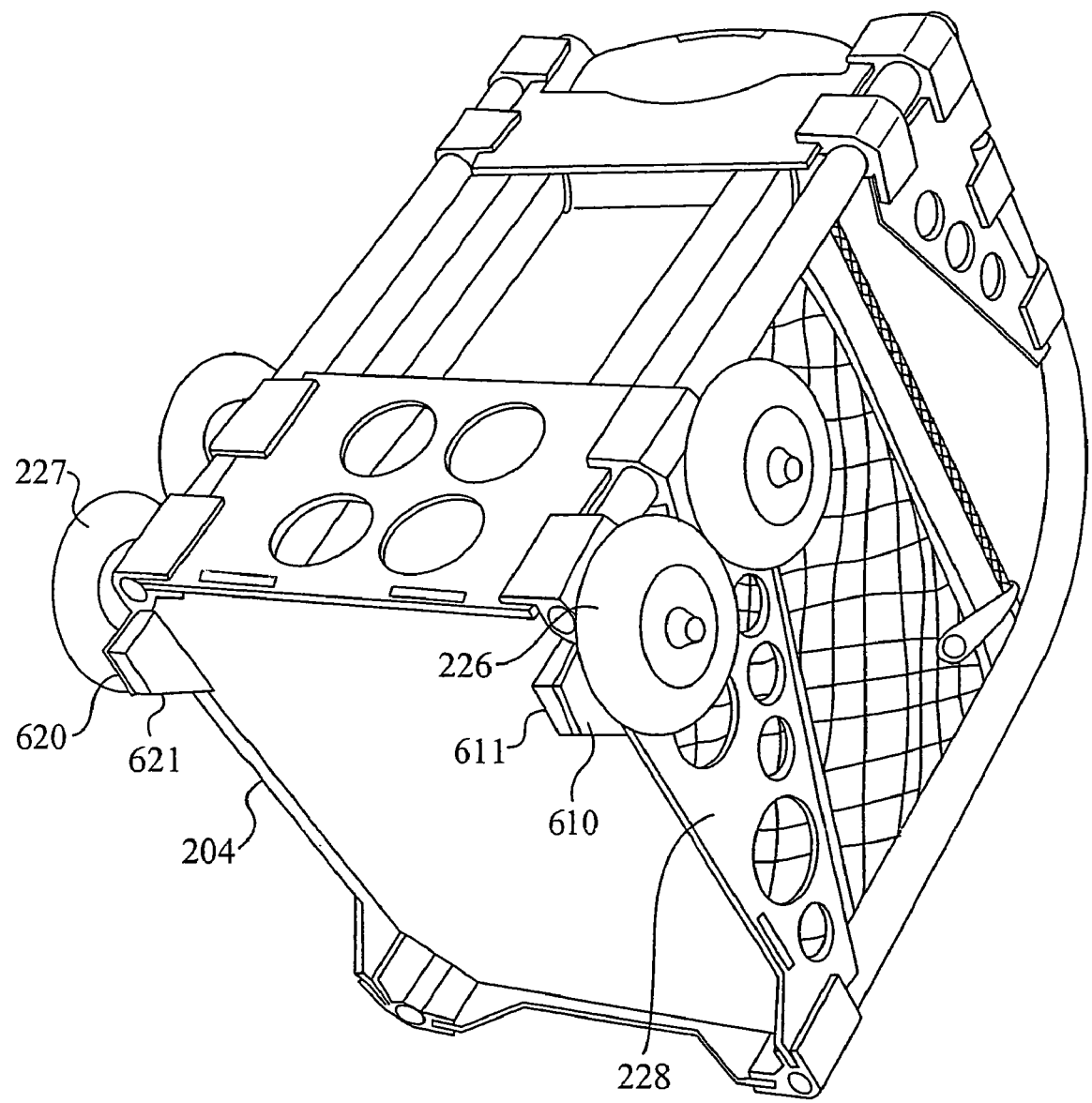
FIG. 6 shows yet another embodiment of the mobile storage unit in accordance with the present invention.

A further objective of the present invention is to provide braking means for the mobile storage unit in accordance with the present invention. Preferably, the braking means comprise respective extensions of the lower left and right panels. For a better understanding, please refer now to FIG. 6. FIG. 6 shows a bottom perspective view of an alternate embodiment of the mobile storage unit in accordance with the present invention. Shown in FIG. 6 are the respective extensions 610, 620 of the lower left and right panels 204, 228.

As can be seen, the respective extensions 610, 620 of the lower left and right panels extend beyond the first and second respective wheels 226, 227. Accordingly, when the mobile storage unit is being tilted to an upright position, the extensions 610, 620 engage the ground surface once the mobile storage unit reaches a tilt angle of between approximately 10°–20°. Once the extensions 610, 620 engage the ground surface, they provide friction against the ground surface thereby enabling a user to bring the mobile storage unit to an upright position in a more controlled fashion. Preferably, rubber attachments 611, 621 are also included to decrease the wear on the respective extensions 610, 620.

Additionally, the extensions 610, 620 provide added stability when the mobile storage unit in is an upright position. For example, if the mobile storage unit is in an upright position and is being utilized as a seat, the extensions 610, 620 are in contact with the ground surface and not the respective first and second wheels 226, 227. This prevents the wheels 226, 227 from engaging with the ground surface thereby causing the mobile storage unit to slip and roll out from under the person sitting on it.

Although the preferred embodiment of the mobile storage unit has been described as being utilized in conjunction with the above-described braking means, one of ordinary skill in the art will readily recognize that a variety of braking means could be utilized in conjunction with the mobile storage unit while remaining within the spirit and scope of the present invention. For example, a spring loaded braking system that is activated based on weight displacement (e.g. a person sitting on the seat) could be employed.

Figure 7:
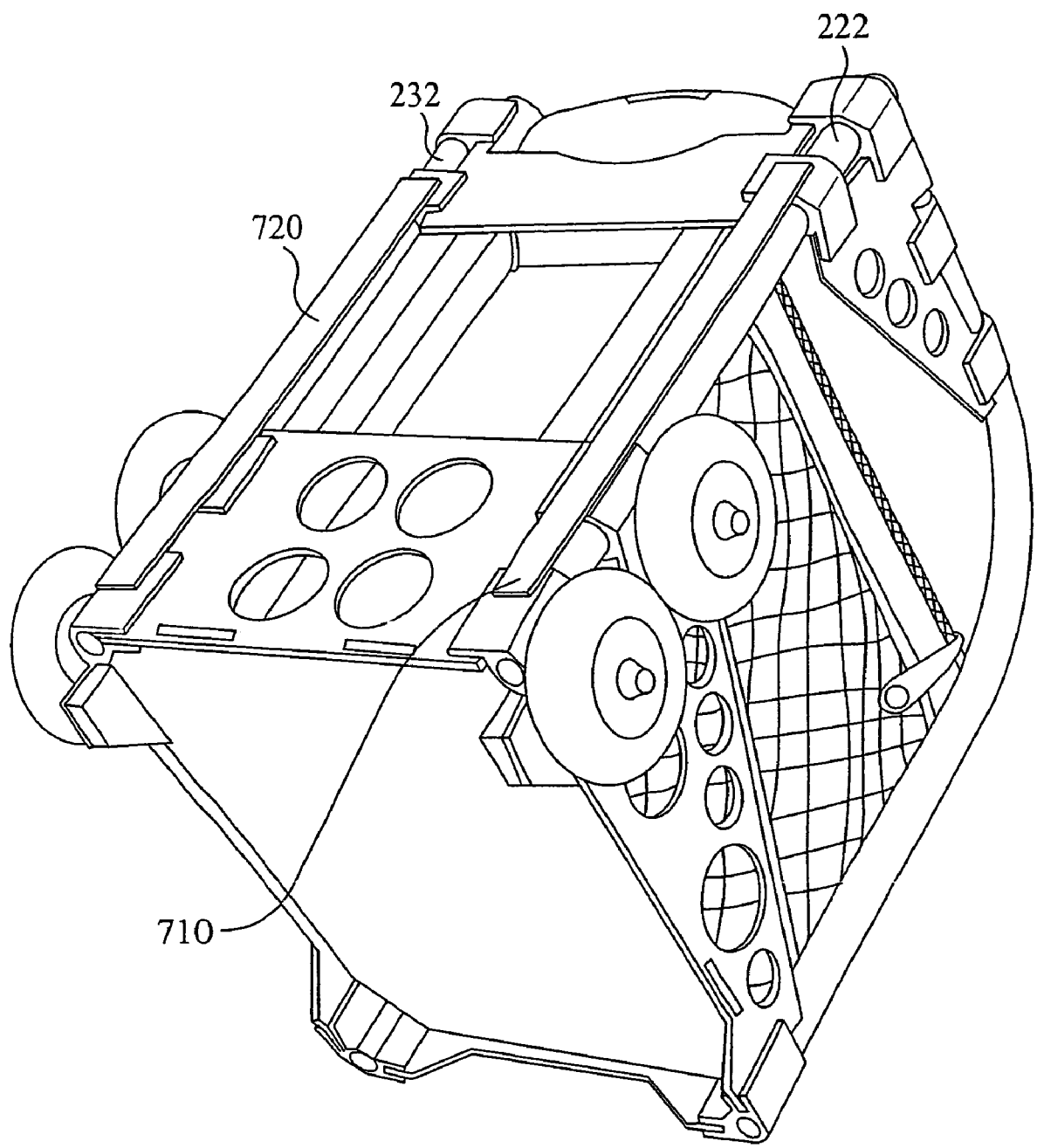
FIG. 7 shows an alternate embodiment of the mobile storage unit in accordance with the present invention.

An additional feature that may be incorporated with the mobile storage unit are grinding rails. For a better understanding please refer to FIG. 7. FIG. 7 shows a bottom perspective view of the mobile storage unit in accordance with the present invention. As can be seen in FIG. 7, two grinding rails 710, 720 are coupled to the back of the mobile storage unit. Preferably, the grinding rails 710, 720 are comprised of a hard plastic or metal material and provide protection for the second and third structural frames 222, 232 when the mobile storage unit is being utilized to traverse unusually high curbs and/or stairs.

A mobile storage unit has been disclosed. Through the use of the mobile storage unit in accordance with the present invention the potential for back problems that are associated with the use of the traditional backpack is eliminated. Furthermore, the mobile storage unit incorporates a seat portion which allows a user to utilize the mobile storage unit as a seat in situations where one is needed yet not available.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A mobile storage unit comprising:
    a) a fixed rigid frame structure formed from hollow tubing and reticulated panels, the fixed mid frame structure having a top portion, a bottom portion, side portions, a front portion and a back portion defining a storage area, the side portions comprising side tubular members and the top portion comprising a rigid top plate member coupled to the side tubular members, wherein the rigid frame structure is substantially open on the side portions and the front portion;
    b) a flexible storage bag within the storage area and coupled to the rigid frame, such that the flexible storage bag substantially occupies the storage area of the rigid frame which is accessible through the side portions and the front portion;
    c) a handle for pulling the mobile storage unit; and
    d) a first pair of wheels coupled near the back portion and the bottom portion of the rigid frame structure for rolling the mobile storage unit allowing tilting of the mobile storage unit backwards and allowing pulling of the mobile storage unit with the handle.

2. The mobile storage unit of claim 1, wherein the top plate member forms a seat panel suitable for sitting while the mobile storage unit is in an upright position.

3. The mobile storage unit of claim 2, wherein the rigid frame structure comprises pieces of tubing that are secured together through structural brackets.

4. The mobile storage unit of claim 3, wherein the rigid frame structure comprises articulated panels secured to the pieces of tubing.

5. The mobile storage unit of claim 3, wherein the rigid frame structure comprises support extensions protruding from the bottom portion to stabilize and support the mobile storage unit in the upright position.

6. The mobile storage unit of claim 1, further comprising a second pair of wheels attached to the back portion of the rigid frame and positioned above the first pair of wheels.

7. The mobile storage unit of claim 1, wherein the flexible storage bag comprises compartments that are accessible through one or more of the side portions and the front portion of the rigid frame structure.

8. The mobile storage unit of claim 1, wherein the flexible storage bag couples to the rigid frame structure through strap features.

9. The mobile storage unit of claim 1, wherein the handle is extendable upwards from the back portion of the rigid frame structure.

10. The mobile storage unit of claim 1, wherein the side tubular members are bent at an angle to form support for the rigid top plate member.

11. A system comprising:
  a) a fixed rigid frame structure with an open front portion, the rigid frame structure being configured for supporting a seat and for framing a storage area, the rigid frame structure formed from hollow tube sections and reticulated panels comprising side tubular members and a rigid top plate member coupled to the side tubular members forming the seat;
  b) a flexible storage bag that attaches to the rigid frame structure and substantially occupies the storage area;
  c) wheels attached along a back side of the rigid frame structure, such that the system can be tilted and rolled on the wheels; and
  d) a base portion for stabilizing the system in an upright position.

12. The system of claim 11, wherein the rigid frame structure comprises tubing, panels and brackets.

13. The system of claim 12, wherein side portions and a front portion of the rigid frame structure are substantially open, such that pockets on the flexible storage bag are accessible through spaces of the side portions and the front portion of the rigid frame.

14. The system of claim 11, wherein the flexible storage bag is secured to the rigid frame through strap features.

15. The system of claim 11, further comprising a handle that extends upward from a back portion of the rigid frame.

16. The system of claim 15, wherein a back portion of the rigid frame structure further comprises a panel with apertures for lifting the system.

17. The system of claim 11, wherein the base portion comprises a panel with protruding features.

18. The system of claim 11, wherein the side tubular members are bent at an angle to form support for the rigid top plate member.

19. A portable storage unit comprising:
  a) a fixed rigid frame structure formed from tubing and panels secured together through structural brackets, the rigid frame structure comprising side tubular members and a rigid too plate member coupled to the side tubular members, the rigid frame structure defining a substantially rectangular storage area and having at least one face that is substantially open, wherein the rigid top plate member forms a seat with the portable storage unit in an upright position;
  b) a flexible storage bag coupled to the fixed rigid frame structure and within the substantially rectangular storage area, such that a compartment of the flexible storage bag is accessible through the at least one face;
  c) a set of wheels that are couple to the rigid frame structure, for rolling the portable storage unit with the portable storage unit in a tilted position; and
  d) an extendable handle for pulling the portable storage unit with the portable storage unit in the tilted position.

20. The portable storage unit of claim 19, wherein the tubing is aluminum tubing and a portion of the panels are articulated.

21. The portable storage unit of claim 19, wherein the flexible storage bag comprises a plurality of storage compartments that are accessible through the rigid frame structure and while the flexible storage bag is positioned within the substantially rectangular storage area.

22. The portable storage unit of claim 19, wherein the side tubular members are bent at an angle to form support for the rigid top plate member.

* * * * *